United States Patent
Bu et al.

(10) Patent No.: US 10,454,340 B2
(45) Date of Patent: Oct. 22, 2019

(54) POWER STORAGE DEVICE

(71) Applicant: SUHDER IND CO., LTD., Miaoli County (TW)

(72) Inventors: Der-Guey Bu, Miaoli County (TW); Jia-Qing Liu, Miaoli County (TW)

(73) Assignee: SUHDER IND CO., LTD., Miaoli County (TW)

( * ) Notice: Subject to any disclaimer, the term of this patent is extended or adjusted under 35 U.S.C. 154(b) by 58 days.

(21) Appl. No.: 15/891,362

(22) Filed: Feb. 7, 2018

(65) Prior Publication Data

US 2019/0245410 A1   Aug. 8, 2019

(51) Int. Cl.
| | |
|---|---|
| *H02K 9/00* | (2006.01) |
| *H02K 7/09* | (2006.01) |
| *H02K 1/02* | (2006.01) |
| *H02K 5/20* | (2006.01) |
| *H02K 21/48* | (2006.01) |
| *H02K 9/16* | (2006.01) |
| *H02K 11/00* | (2016.01) |
| *H02K 7/08* | (2006.01) |

(52) U.S. Cl.
CPC ............. *H02K 7/09* (2013.01); *H02K 1/02* (2013.01); *H02K 5/20* (2013.01); *H02K 7/083* (2013.01); *H02K 9/16* (2013.01); *H02K 11/0094* (2013.01); *H02K 21/48* (2013.01)

(58) Field of Classification Search
CPC .. H02K 7/09; H02K 1/02; H02K 5/20; H02K 7/083; H02K 9/16

USPC ..................... 310/58–59, 51, 90.5
See application file for complete search history.

(56) References Cited

U.S. PATENT DOCUMENTS

| | | | | |
|---|---|---|---|---|
| 4,037,886 A | * | 7/1977 | Boden ................ | F16C 32/0474 310/90.5 |
| 4,128,280 A | * | 12/1978 | Purtschert .............. | F16C 17/03 310/90.5 |
| 2010/0044607 A1 | * | 2/2010 | Miki ....................... | F16K 3/06 251/129.11 |
| 2013/0049507 A1 | * | 2/2013 | Lang ...................... | H02K 7/09 310/90.5 |

* cited by examiner

*Primary Examiner* — Thanh Lam
(74) *Attorney, Agent, or Firm* — Sinorica, LLC

(57) ABSTRACT

A power storage device includes a drive unit, a generating unit, and a power supply unit. The drive unit has a rotating shaft and is disposed in a housing. The rotating shaft is provided with a plurality of first permanent magnets. The housing is provided with a first auxiliary magnet corresponding to the first permanent magnets. Corresponding surfaces of the first permanent magnets and the first auxiliary magnet have the same magnetic pole. Through the repulsive force between the first permanent magnets and the first auxiliary magnet to generate a magnetic levitation effect, the rotating shaft can generate a corresponding rotation and the rotating shaft can be rotated more smoothly to increase its rotational speed and smoothness to improve generating efficiency and reduce electricity consumption.

9 Claims, 6 Drawing Sheets

POWER STORAGE DEVICE

FIELD OF THE INVENTION

The present invention relates to a power storage device, and more particularly to a power storage device with high-efficiency generating capability.

BACKGROUND OF THE INVENTION

When a conventional generator is running, natural energy, such as solar power, wind power and hydroelectric power, is used to convert natural energy into required electricity. However, the generator using natural resources as mentioned above generates enough electricity to supply all kinds of large-scale machinery for operation, but it is large in size. Therefore, when the generator is applied to bicycles, electric cars or small household appliances, there is a need for improvement.

In view of the above, some improvements have been made to the above drawbacks. As shown in FIG. 1 and FIG. 2, a permanent magnet synchronous generator mainly includes two generating units 1, a drive unit 2, and a power supply unit 3. The power supply unit 3 is connected to the drive unit 2 to provide the drive unit 2 with the electric power needed to rotate the generating units 1 pivotally connected to two ends of the drive unit 2, so that the generating units 1 convert the mechanical energy into the required electric energy. Compared with the above conventional generator, this creation actually reduces the size greatly and facilitates the assembly. However, in the above creation, the rotating shaft of the drive unit is not smooth during operation, so that the generating efficiency of the generating units is poor. Accordingly, the inventor of the present invention has devoted himself based on his many years of practical experiences to solve these problems.

SUMMARY OF THE INVENTION

The primary object of the present invention is to provide a power storage device which can rotate a rotating shaft smoothly and generate electricity with high-efficiency voltage, current and frequency.

In order to achieve the aforesaid object, the power storage device of the present invention comprises a drive unit, a first permanent magnet assembly, and a first auxiliary magnet. The drive unit is disposed in a housing. The drive unit has a rotating shaft. An outer periphery of a middle section of the rotating shaft is fixedly connected with a drive rotor. An outer periphery of the drive rotor is provided with a drive stator. Two ends of the rotating shaft are sleeved with a first bearing and a second bearing, respectively. At least one of the two ends of the rotating shaft is connected with a generating unit. The drive unit and the generating unit are electrically connected to a power supply unit. The power supply unit supplies starting electricity to the drive unit and recycles excess electricity generated by the generating unit. The first permanent magnet assembly is fixed on the rotating shaft and located between the drive rotor and the first bearing. The first permanent magnet assembly has a plurality of first permanent magnets. The first auxiliary magnet corresponds to the first permanent magnet assembly and is disposed on the housing. Corresponding surfaces of the first permanent magnets and the first auxiliary magnet have a same magnetic pole.

The corresponding surfaces of the first permanent magnets and the first auxiliary magnet have the same magnetic pole and therefore have a repulsive force.

Through the magnetic levitation effect between the first permanent magnets and the first auxiliary magnet, the rotating shaft can generate a corresponding rotation and the rotating shaft can be rotated more smoothly to enhance generating efficiency.

DETAILED DESCRIPTION OF THE PREFERRED EMBODIMENTS

Embodiments of the present invention will now be described, by way of example only, with reference to the accompanying drawings.

Figure 1:
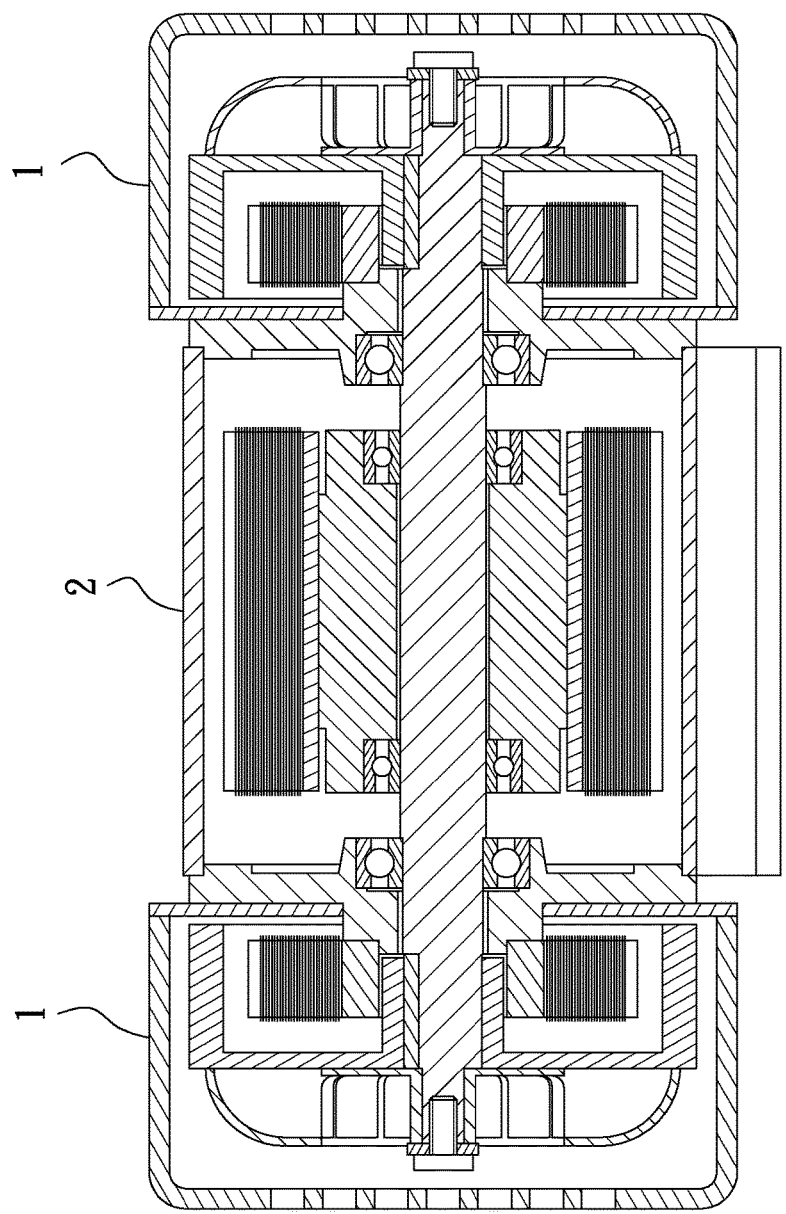
FIG. 1 is a cross-sectional view of a conventional power storage device.
Figure 2:
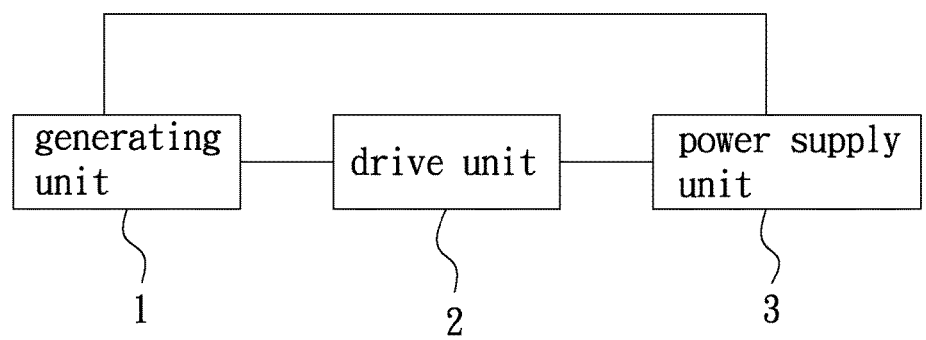
FIG. 2 is a block diagram of the conventional power storage device.
Figure 3:
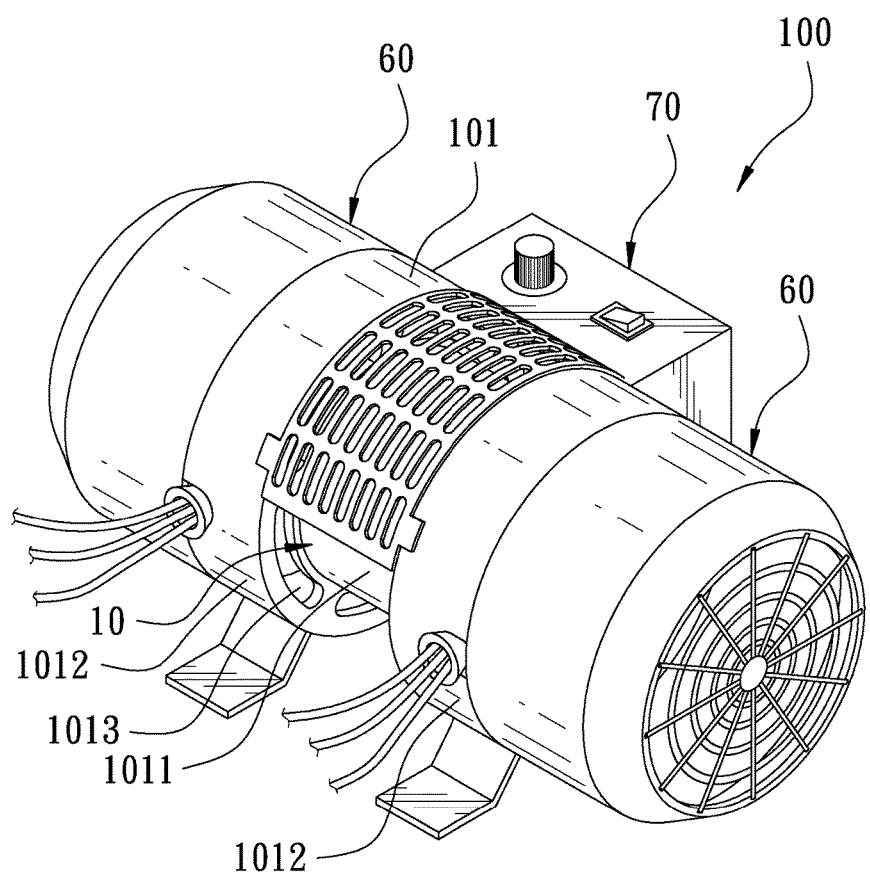
FIG. 3 is a perspective view in accordance with a preferred embodiment of the present invention.
Figure 4:
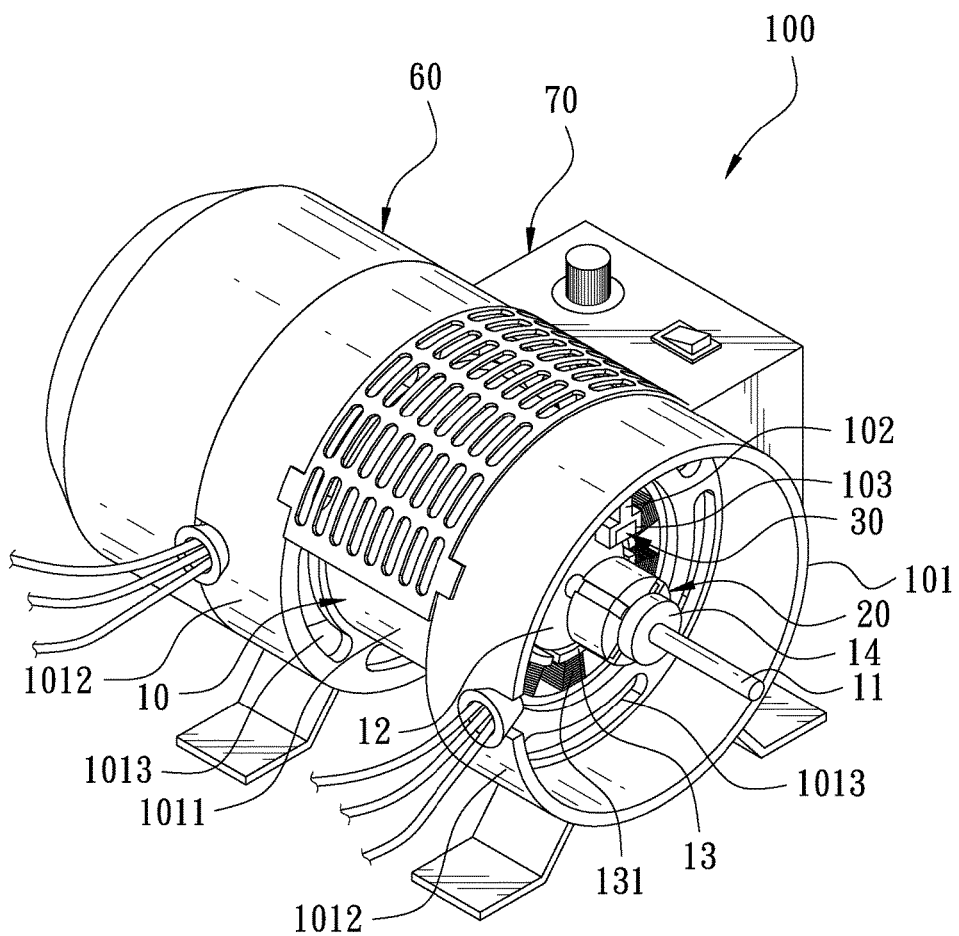
FIG. 4 is a perspective view in accordance with the preferred embodiment of the present invention, showing that one end of the power storage device is not mounted with the generating unit.

FIG. 3 is a perspective view in accordance with a preferred embodiment of the present invention. FIG. 4 is a perspective view in accordance with the preferred embodiment of the present invention, without generating units. The present invention discloses a power storage device 100. The power storage device 100 comprises a housing 101, a drive unit 10, a first permanent magnet assembly 20, a first auxiliary magnet 30, a second permanent magnet assembly 40, a second auxiliary magnet 50, two generating units 60, and a power supply unit 70.

The housing 101 has a hollow cylindrical body. The outer diameter of a middle section of the housing 101 is less than the outer diameter of two sides of the housing 101. Therefore, the middle section of the housing 101 is formed with a reduced portion 1011, and the two sides of the housing 101 are formed with enlarged portions 1012, respectively. The enlarged portions 1012 correspond to the outer sidewalls of the reduced portion 1011 and are provided with a plurality of arc-shaped heat dissipation holes 1013 around the outer periphery of the reduced portion 1011.

Figure 5:
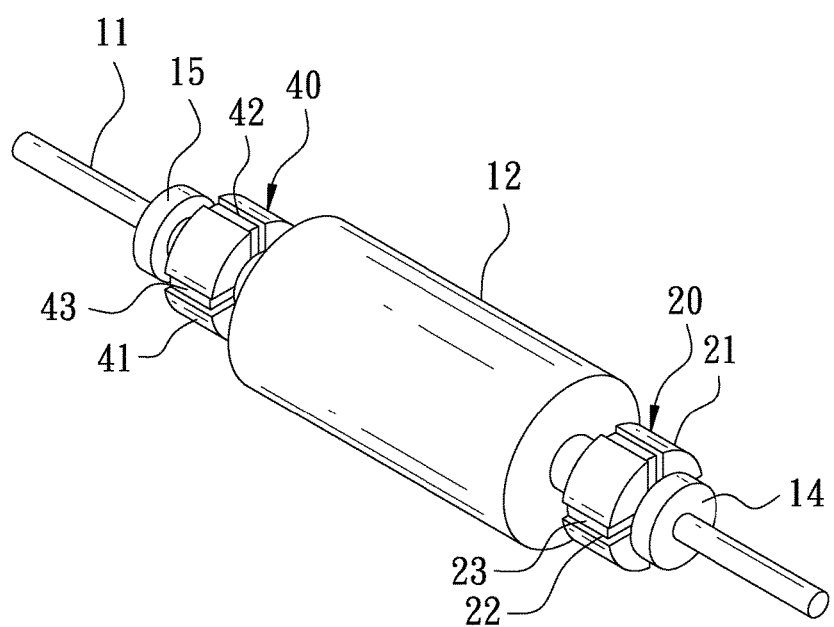
FIG. 5 is a perspective view of the rotating shaft in accordance with the preferred embodiment of the present invention.

The drive unit 10 is disposed in the housing 101. The drive unit 10 has a rotating shaft 11. Referring to FIG. 5, the outer periphery of the middle section of the rotating shaft 11 is fixedly connected with a drive rotor 12. The drive rotor 12 is a multi-polar magnet. The drive rotor 12 is made of soft iron added with graphene. The outer periphery of the drive rotor 12 is provided with a drive stator 13. The drive rotor 12 and the drive stator 13 are disposed in the reduced portion 1011. The drive stator 13 is fixed to the inner wall of the reduced portion 1011. The drive stator 13 has a plurality of drive coils 131. Two ends of the rotating shaft 11 are sleeved with a first bearing 14 and a second bearing 15, respectively.

The first permanent magnet assembly 20 is fixed on the rotating shaft 11 and located between the drive rotor 12 and the first bearing 14. The first permanent magnet assembly 20 has a first body seat 21. The outer periphery of the first body seat 21 is formed with a plurality of first receiving slots 22. Each of the first receiving slots 22 is provided with a first permanent magnet 23.

The first auxiliary magnet 30 corresponds to the first permanent magnet assembly 20 and is disposed on the housing 101. The housing 101 is provided with a first bracket 102 corresponding to the first permanent magnet assembly 20. The first bracket 102 is formed with a first recess 103. The first auxiliary magnet 30 is disposed in the first recess 103. The corresponding surfaces of the first permanent magnet 23 and the first auxiliary magnet 30 have the same magnetic pole.

Figure 6:
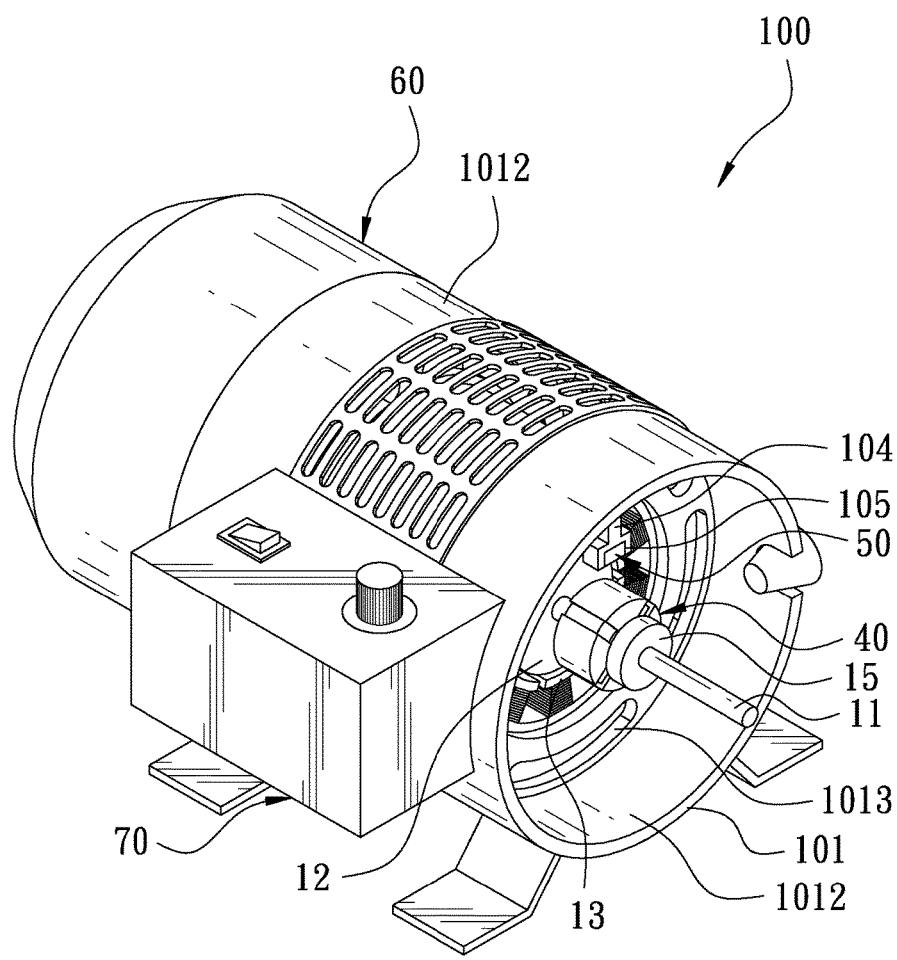
FIG. 6 is a perspective view in accordance with the preferred embodiment of the present invention, showing that the other end of the power storage device is not mounted with the generating unit.

The second permanent magnet assembly 40, referring to FIG. 6, is fixed on the rotating shaft 11 and located between the drive rotor 12 and the second bearing 15. The second permanent magnet assembly 40 has a second body seat 41. The outer periphery of the second body seat 41 is formed with a plurality of second receiving slots 42. Each of the second receiving slots 42 is provided with a second permanent magnet 43.

The second auxiliary magnet 50 corresponds to the second permanent magnet assembly 40 and is disposed on the housing 101. The housing 101 is provided with a second bracket 104 corresponding to the second permanent magnet assembly 40. The second bracket 102 is formed with a second recess 105. The second auxiliary magnet 50 is disposed in the second recess 105. The corresponding surfaces of the second permanent magnet 43 and the second auxiliary magnet 50 have the same magnetic pole. The magnetic pole of the corresponding surfaces of the first permanent magnet 23 and the first auxiliary magnet 30 and the magnetic pole of the corresponding surfaces of the second permanent magnet 43 and the second auxiliary magnet 50 are opposite poles.

The two generating units 60 are disposed at the two ends of the rotating shaft 11, respectively.

The power supply unit 70 is electrically connected to the drive unit 10 for supplying starting electricity to the drive unit 10 and electrically connected to the generating units 60 for recycling excess electricity generated by the generating units 60.

The power supply unit 70 is electrically connected to the drive unit 10 so that the drive stator 13 of the drive unit 10 generates magnetic lines of force. Due to the variation of the sine wave frequency, the polarity generated by the drive coils 131 also changes so as to induce the drive rotor 12 covered by the drive stator 13 to generate corresponding rotation. The drive rotor 12 drives the rotating shaft 11 fixed at its central axis to rotate. The corresponding surfaces of the first permanent magnet 23 and the first auxiliary magnet 30 have the same magnetic pole and therefore have a repulsive force, providing a magnetic levitation effect. The corresponding surfaces of the second permanent magnet 43 and the second auxiliary magnet 50 have the same magnetic pole and therefore have a repulsive force, providing a dual magnetic levitation effect, so that the rotating shaft 11 can generate a corresponding rotation and the rotating shaft 11 can be rotated more smoothly to increase its rotational speed and smoothness.

Then, the rotating shaft 11 will rotate and drive the generating units 60 to generate induced current so that the generating units 60 can supply the required electricity to the loads connected to the generating units 60 to generate electricity with high-efficiency voltage, current and frequency to improve generating efficiency and reduce electricity consumption. When the electricity is excessive, the excess electricity may be stored in the power supply unit 70.

It is worth mentioning that since the generating units 60 generate heat during operation, the heat can be guided out through the heat dissipation holes 1013 of the housing 101 to improve the heat dissipation of the generating units 60.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A power storage device, comprising:
a drive unit, disposed in a housing, the drive unit having a rotating shaft, an outer periphery of a middle section of the rotating shaft being fixedly connected with a drive rotor, an outer periphery of the drive rotor being provided with a drive stator, two ends of the rotating shaft being sleeved with a first bearing and a second bearing respectively, at least one of the two ends of the rotating shaft being connected with a generating unit, the drive unit and the generating unit being electrically connected to a power supply unit, the power supply unit supplying starting electricity to the drive unit and recycling excess electricity generated by the generating unit, characterized by:
a first permanent magnet assembly, fixed on the rotating shaft and located between the drive rotor and the first bearing, the first permanent magnet assembly having a plurality of first permanent magnets;
a first auxiliary magnet, corresponding to the first permanent magnet assembly and disposed on the housing, corresponding surfaces of the first permanent magnets and the first auxiliary magnet having a same magnetic pole.

2. The power storage device as claimed in claim 1, wherein the first permanent magnet assembly includes a first body seat, an outer periphery of the first body seat is formed with a plurality of first receiving slots, and the first permanent magnets are disposed in the first receiving slots respectively.

3. The power storage device as claimed in claim 1, wherein the housing is provided with a first bracket corresponding to the first permanent magnet assembly, the first bracket is formed with a first recess, and the first auxiliary magnet is disposed in the first recess.

4. The power storage device as claimed in claim 1, wherein the power storage device comprises two generating units, the two generating units are disposed at the two ends of the rotating shaft respectively, a second permanent magnet assembly is fixed on the rotating shaft and located between the drive rotor and the second bearing, the second permanent magnet assembly has a plurality of second permanent magnets, the housing is provided with a second auxiliary magnet corresponding to the second permanent magnet assembly, corresponding surfaces of the second permanent magnets and the second auxiliary magnet have a same magnetic pole.

5. The power storage device as claimed in claim 4, wherein the second permanent magnet assembly includes a second body seat, an outer periphery of the second body seat is formed with a plurality of second receiving slots, the second permanent magnets are disposed in the second receiving slots respectively, the housing is provided with a second bracket corresponding to the second permanent magnet assembly, the second bracket is formed with a second recess, and the second auxiliary magnet is disposed in the second recess.

6. The power storage device as claimed in claim 4, wherein the magnetic pole of the corresponding surfaces of the first permanent magnets and the first auxiliary magnet and the magnetic pole of the corresponding surfaces of the second permanent magnets and the second auxiliary magnet are opposite poles.

7. The power storage device as claimed in claim 4, wherein the housing has a hollow cylindrical body, an outer diameter of a middle section of the housing is less than an outer diameter of two sides of the housing, the middle section of the housing is formed with a reduced portion, the two sides of the housing are formed with enlarged portions, the enlarged portions correspond to outer sidewalls of the reduced portion and are provided with a plurality of arc-shaped heat dissipation holes around an outer periphery of the reduced portion.

8. The power storage device as claimed in claim 7, wherein the drive rotor and the drive stator are disposed in the reduced portion, and the drive stator is fixed to an inner wall of the reduced portion.

9. The power storage device as claimed in claim 1, wherein the drive rotor is made of soft iron added with graphene.

* * * * *